United States Patent Office 3,477,451
Patented Nov. 11, 1969

3,477,451
REMOVAL OF DEPOSITS FROM PROCESS VESSELS
Theodore E. Majewski, Midland, Mich., assignor to The Dow Chemical Company, Midland, Mich., a corporation of Delaware
No Drawing. Filed Aug. 30, 1967, Ser. No. 664,274
Int. Cl. C23g *5/02;* B08b *9/02*
U.S. Cl. 134—22                    11 Claims

ABSTRACT OF THE DISCLOSURE

The method concerns removing or cleaning carbonaceous deposits from process vessels fouled therewith used in the manufacture of styrene monomers, conjugated diene monomers, alpha-monoolefin monomers or styrene-butadiene rubbers by contacting the deposits with a $C_8$–$C_{12}$ alkyl-substituted phenol or a halo-substituted phenol, or mixture thereof at temperatures between about 300° and 575° F.

---

This invention pertains to the removal or cleaning out of carbonaceous deposits in process vessels for the manufacture of styrene monomers, conjugated diene monomers, alpha-monoolefin monomers and styrene-butadiene rubber.

In such process vessels, after a period of operation, heavy carbonaceous deposits build up with resultant partial plugging thereof and resultant inefficient and undesirable operating conditions. Periodically, therefore, the manufacturing processes are shut down to remove or clean the deposits from the process vessels affected thereby. The carbonaceous deposits appear to be polymeric and crosslinked in nature since they are difficultly soluble in many of the commonly known organic solvents for the related polymer.

Usually, these troublesome deposits which foul up the process equipment can be removed by manual or mechanical means, both of which are expensive as well as time-consuming.

Surprisingly, it has now been found that the fouling carbonaceous deposits can be removed with minimum expense, time and damage to process equipment from the process vessels used in the manufacture of styrene monomers, conjugated diene monomers, alpha- monoolefin monomers, and styrene-butadiene rubbers by contacting, after shutting down the process, the carbonaceous deposits in the process vessels fouled therewith with a $C_8$–$C_{12}$ alkyl-substituted phenol or a halo-substituted phenol or mixtures thereof at temperatures between about 300° and 575° F. whereby the deposits are washed away, leaving the treated process vessels substantially free of any carbonaceous deposits.

To remove or clean the carbonaceous deposits from the process equipment fouled therewith, the foulant deposited therein is contacted with at least a solubilizing amount of a $C_8$–$C_{12}$ alkyl-substituted phenol, e.g. nonylphenol, or a halo-substituted phenol, e.g. o-chlorophenol, p-chlorophenol or 2,4,6-trichlorophenol, or mixture thereof. For example, the carbonaceous deposits can be contacted with about 10–50 gallons of solvent per pound of deposit.

The solvent can be contacted with the carbonaceous deposits in the process vessels fouled therewith at a temperature between about 300° and 575° F. If the temperature used is too low, the amount of dissolution will be very small. If the temperature used is too high, the process equipment can be damaged by overheating.

The carbonaceous deposits in the process vessels fouled therewith can be contacted with the solvent for a period of from about 2.5 to 8 hours or more, preferably from about 4 to 7 hours, and at atmospheric pressure or thereabout.

The quantity of the solvent as well as the length of time required to clean the fouled process equipment will depend in part upon the interval between cleanings and in part upon the extent of carbonaceous buildup. The method of this invention is useful for removing or cleaning out the carbonaceous deposits which build up within any process vessel used in the manufacture of styrene monomers, conjugated diene monomers, alpha-monoolefin monomers, or styrene-butadiene rubbers, such as condensers, coolers, heat exchangers, reboilers, etc.

The following non-limiting examples serve to illustrate the invention.

EXAMPLE 1A

Samples of various carbonaceous deposits found in process vessels fouled therewith were placed in a stainless steel container which was perforated in order for the solvent to contact the sample. The container was weighed with and without the sample, before and after treatment. The container with the sample was placed in a round bottom 1000 ml. flask containing the solvent which was present in amount corresponding to 150 ml. of solvent per gram of deposit. The flask was equipped with a thermometer and reflux condenser. Heating was accomplished by means of a mantle and variac. The flask was brought to the desired temperature and held there the desired length of time. After cooling the flask to room temperature, the container was removed and the sample and container washed with acetone to remove any residual solvent. After drying the container and sample at 175° F., the container was weighed and the loss in weight calculated.

EXAMPLE 1B

The sample tested was from a heat exchanger in a styrene manufacturing unit. The deposit accumulated in a bundle of tubes which could not be pulled for manual cleaning because the heat exchanger was all-welded construction.

TABLE I.—DEPOSITS FOUND IN STYRENE MANUFACTURING UNIT

| Solvent | Temp., °F. | Time, hours | Wt. percent dissolved |
|---|---|---|---|
| Run No.: | | | |
| 1 ..... Nonylphenol ........... | 500 | 7 | 85 |
| 2 ........ do .................. | 570 | 5 | 100 |
| 3 ..... p-Chlorophenol ......... | 427 | 8 | 100 |
| 4 ..... 2,4,6, trichlorophenol ... | 478 | 8 | 100 |

EXAMPLE 1C

TABLE II.—DEPOSITS FOUND IN STYRENE-BUTADIENE RUBBER MANUFACTURING UNIT

| Solvent | Temp., °F. | Time, hours | Wt. percent dissolved |
|---|---|---|---|
| Run No.: | | | |
| 1 ............ Nonylphenol ..... | 390 | 5 | 94 |
| 2 ................ do ........... | 300 | 7 | 94 |
| 3 ............ o-Chlorophenol ... | 300 | 5 | 100 |
| 4 ............ p-Chlorophenol ... | 394 | 3 | 97 |
| 5 ............ Nonylphenol ..... | 455 | 5 | 100 |
| 6 ............ o-Chlorophenol ... | 280 | 5 | 93 |
| 7 ............ p-Chlorophenol ... | 398 | 2.5 | 98 |

EXAMPLE 1D

TABLE III.—DEPOSITS FOUND IN BUTADIENE MANUFACTURING UNIT

| Solvent | Temp., °F. | Time, hours | Wt. percent dissolved |
|---|---|---|---|
| Run No.: | | | |
| 1 ........... p-Chlorophenol ... | 425 | 2.5 | 45 |
| 2 ........... o-Chlorophenol ... | 300 | 5 | 84 |

EXAMPLE 1E

TABLE IV.—DEPOSITS FOUND IN ETHYLENE MANUFACTURING UNIT

| Run No.: | Solvent | Temp., °F. | Time, hours | Wt. percent dissolved |
|---|---|---|---|---|
| 1 | Nonylphenol | 550 | 6.5 | 59 |
| 2 | Phenol | 355 | 5.5 | 0 |

I claim:

1. A method for removing or cleaning carbonaceous deposits from process vessels used in the manufacture of styrene monomers, conjugated diene monomers, alpha-monoolefin monomers or styrene-butadiene rubbers which comprises contacting, after shutting down the manufacturing process, the carbonaceous deposits in the process vessels fouled therewith with (1) a $C_8$-$C_{12}$ alkyl-substituted phenol or (2) a halo-substituted phenol, or mixture thereof at temperatures between about 300° and 575° F.

2. The method of claim 1 wherein the deposits are contacted for a period of from about 2.5 to 8 hours.

3. The method of claim 1 wherein the deposits are contacted with about 10–50 gallons of said phenol per pound of deposit.

4. The method of claim 1 wherein the carbonaceous deposit is formed in the manufacture of styrene.

5. The method of claim 1 wherein the carbonaceous deposit is formed in the manufacture of butadiene.

6. The method of claim 1 wherein the carbonaceous deposit is formed in the manufacture of ethylene.

7. The method of claim 1 wherein the carbonaceous deposit is formed in the manufacture of styrene-butadiene rubber.

8. The method of claim 1 wherein the alkyl-substituted phenol is nonylphenol.

9. The method of claim 1 wherein the halo-substituted phenol is o-chlorophenol.

10. The method of claim 1 wherein the halo-substituted phenol is p-chlorophenol.

11. The method of claim 1 wherein the halo-substituted phenol is 2,4,6-trichlorophenol.

References Cited

UNITED STATES PATENTS

| | | | |
|---|---|---|---|
| 2,242,106 | 5/1941 | Buckman | 134—38 XR |
| 2,380,340 | 7/1945 | Simpson | 134—39 XR |
| 2,610,166 | 9/1952 | Parry et al. | 134—38 XR |
| 2,956,911 | 10/1960 | Jelen | 134—22 |
| 3,070,548 | 12/1962 | Brooke | 134—22 XR |
| 3,335,087 | 8/1967 | Keers | 134—38 XR |

FOREIGN PATENTS 837,955  6/1960  Great Britain.

MORRIS O. WOLK, Primary Examiner

J. T. ZATARGA, Assistant Examiner

U.S. Cl. X.R.

134—19, 39